(12) United States Patent
Wei

(10) Patent No.: US 12,178,159 B2
(45) Date of Patent: Dec. 31, 2024

(54) LAWN MOWER WITH REAR COVER FOR SELECTIVELY DRIVING A BAFFLE

(71) Applicant: Greenworks (Jiangsu) Co., Ltd, Jiangsu (CN)

(72) Inventor: Lv Wei, Jiangsu (CN)

(73) Assignee: Greenworks (Jiangsu) Co., Ltd, Changzhou (CN)

( * ) Notice: Subject to any disclaimer, the term of this patent is extended or adjusted under 35 U.S.C. 154(b) by 72 days.

(21) Appl. No.: 18/143,054

(22) Filed: May 3, 2023

(65) Prior Publication Data

US 2023/0270048 A1 Aug. 31, 2023

Related U.S. Application Data

(63) Continuation of application No. 17/117,302, filed on Dec. 10, 2020, now Pat. No. 11,678,608.

(30) Foreign Application Priority Data

Dec. 10, 2019 (CN) .......................... 201911256508.7

(51) Int. Cl.
| | | |
|---|---|---|
| *A01D 43/063* | (2006.01) | |
| *A01D 34/68* | (2006.01) | |
| *A01D 34/71* | (2006.01) | |
| *A01D 34/81* | (2006.01) | |
| *A01D 42/00* | (2006.01) | |
| *A01D 69/06* | (2006.01) | |
| *A01D 101/00* | (2006.01) | |

(52) U.S. Cl.
CPC .......... *A01D 43/063* (2013.01); *A01D 34/68* (2013.01); *A01D 34/71* (2013.01); *A01D 34/81* (2013.01); *A01D 42/005* (2013.01); *A01D 69/06* (2013.01); *A01D 2101/00* (2013.01)

(58) Field of Classification Search
CPC ...... A01D 43/063; A01D 34/71; A01D 34/81; A01D 42/005; A01D 69/06
See application file for complete search history.

(56) References Cited

U.S. PATENT DOCUMENTS

| | | | | |
|---|---|---|---|---|
| 3,949,540 | A * | 4/1976 | Christopherson | .... A01D 43/063 56/202 |
| 4,326,370 | A * | 4/1982 | Thorud | .................. A01D 34/82 56/320.1 |
| 4,800,712 | A * | 1/1989 | Morse | ................ A01D 43/0631 56/16.6 |

(Continued)

FOREIGN PATENT DOCUMENTS

CN 109964626 A * 7/2019 ........... A01D 43/063

OTHER PUBLICATIONS

CN 109964626 A—English translation (Year: 2019).*

*Primary Examiner* — Thomas B Will
*Assistant Examiner* — Julia C Tran

(57) ABSTRACT

A lawn mower comprises a power assembly, a cutting blade driven by the power assembly, and a cover, wherein the cover comprises a main body, a rear cover pivotally connected to the rear of the main body, and a partition portion dividing the main body into a cutting cavity and a grass-collecting cavity, the partition portion comprising a baffle, the rear cover is selectively pivotal between an open position and a closed position. The baffle is driven by the rear cover.

11 Claims, 6 Drawing Sheets

(56) References Cited

U.S. PATENT DOCUMENTS

| | | | | |
|---|---|---|---|---|
| 2003/0182916 A1* | 10/2003 | Iida | ............... | A01D 42/005 |
| | | | | 56/202 |
| 2003/0182919 A1* | 10/2003 | Baumann | ............... | A01D 34/71 |
| | | | | 56/320.1 |
| 2006/0185341 A1* | 8/2006 | Grimwade | ............ | A01D 42/005 |
| | | | | 56/202 |
| 2008/0092509 A1* | 4/2008 | Imanishi | ............... | A01D 42/005 |
| | | | | 56/320.2 |
| 2010/0115901 A1* | 5/2010 | Hurst | ............... | A01D 43/063 |
| | | | | 56/2 |
| 2010/0269474 A1* | 10/2010 | Hansen | ............... | A01D 34/81 |
| | | | | 56/16.7 |
| 2019/0289781 A1* | 9/2019 | Meeks | ............... | A01D 34/71 |
| 2020/0323130 A1* | 10/2020 | Shaffer | ............... | A01D 34/71 |

\* cited by examiner

LAWN MOWER WITH REAR COVER FOR SELECTIVELY DRIVING A BAFFLE

CROSS-REFERENCE TO RELATED INVENTIONS

This application is a Continuation application of U.S. patent application Ser. No. 17/117,302, filed on Dec. 10, 2020, which is based upon and claims the benefit of priority from the prior Chinese Patent Application No. 201911256508.7, filed on Dec. 10, 2019, the entire contents of which are incorporated herein by reference.

TECHNICAL FIELD

The invention relates to lawn mower, in particular to a lawn mower that are selectively convertible by the user between collecting and mulching modes of operation.

BACKGROUND ART

Lawn mowers are well known for mowing grass. After the grass is cut by the lawn mower, the broken grass needs to be treated. There are four processing modes for the broken grass: floor covering, side discharge, grass-collecting and covering. Floor covering is to discharge the broken grass from the bottom of the lawn mower, and side discharge is to discharge the broken grass from the side of the lawn mower. The grass-collecting and covering are both to discharge the broken grass from the rear of the lawn mower. The grass-collecting is to discharge the broken grass from the rear of the lawn mower and collect in the bag.

The existing lawn mower needs to be manually assembled and disassembled the related parts on the lawn mower. However, on the one hand, manual work is time-consuming and labor-intensive for the operator, on the other hand, the disassembled parts are easily lost, resulting in unnecessary losses.

In view of this, it is indeed necessary to provide a lawn mower to solve the above problems.

SUMMARY OF INVENTION

The object of the present invention is to provide a lawn mower with convenient operation and simple structure.

To achieve the above objective, the present invention adopts the following technical solutions. A lawn mower comprises a power assembly, a cutting blade driven by the power assembly; and a cover, wherein the cover comprises a main body, a rear cover pivotally connected to the rear of the main body, and a partition portion dividing the main body into a cutting cavity and a grass-collecting cavity, the partition portion comprising a baffle, the rear cover is selectively pivotal between an open position and a closed position, the baffle is driven by the rear cover.

As a further improved technical solution of the present invention, the rear cover is rotated between an open position and a closed position, and a rear opening is provided at the rear of the grass-collecting cavity. When the rear cover is flipped up to the open position, the rear opening is opened. When the rear cover is flipped down to the closed position, the rear opening is closed.

As a further improved technical solution of the present invention, when the rear cover is flipped to the open position, the baffle is moved to a connected position, and the cutting cavity is in communication with the grass-collecting cavity. When the rear cover is flipped to a closed position, the baffle moves to the separated position, and the cutting cavity is separated from the grass-collecting cavity.

As a further improved technical solution of the present invention, a side opening is provided on one side of the cutting cavity, and a reversible side cover and a side detachable pipe are provided at the side opening.

As a further improved technical solution of the present invention, the baffle is connected to the rear cover through a transmission assembly, and the transmission assembly includes a rotating shaft provided on the rear cover. A gear bar is arranged on the baffle and a transmission member is arranged in the grass-collecting cavity.

As a further improved technical solution of the present invention, the transmission member comprises a housing, an input gear, an output gear, and an intermediate gear located between the input gear and the output gear. The input gear, the output gear and the intermediate gear are received in the housing. The input gear is sleeved on the rotating shaft, the output gear is coupled with the gear bar, and the rotating shaft and the longitudinal axis of the output gear are arranged perpendicular to each other.

As a further improved technical solution of the present invention, the input gear and the intermediate gear are a pair of matched bevel gears, and the intermediate gear and the output gear have two opposed friction surfaces. A cushion ring and a spring are provided below the output gear, the cushion ring is located between the output gear and the spring, and the spring is located between the housing and the cushion ring.

As a further improved technical solution of the present invention, the rear cover is pivotally connected to the main body through the rotating shaft, a spring is sleeved on the rotating shaft, and the spring is located between the rear cover and the main body.

As a further improved technical solution of the present invention, the lawn mower further comprises a limiting assembly. The limiting assembly comprises a groove provided below the baffle and a hook provided in the grass-collecting cavity and cooperating with the groove.

As a further improved technical solution of the present invention, the lawn mower further comprises a grass collecting bag. When the rear cover is in the open position, the grass collecting bag is assembled to the rear opening of the grass-collecting cavity.

As a further improved technical solution of the present invention, the main body comprises a fixing portion and a partition plate, and the partition plate and the baffle form the partition portion. When the baffle is moved to the connected position, the partition plate overlaps the baffle. When the baffle is moved to the separated position, the partition plate and the baffle are staggered.

As a further improved technical solution of the present invention, the fixing portion is provided with a slide, the upper and lower ends of the baffle are provided with sliders, and the sliders are installed in the slide and move along the slide.

The beneficial effect of the invention is that a partition portion is provided, and the baffle is moved left and right through the upside-down flip of the rear cover, so that the cutting cavity and the grass-collecting cavity are connected and separated, and the operation is convenient and the structure is simple.

DESCRIPTION OF EMBODIMENT

In order to make the objectives, technical solutions, and advantages of the present invention clearer, the following describes the present invention in detail with reference to the accompanying drawings and specific embodiment.

Figure 1:
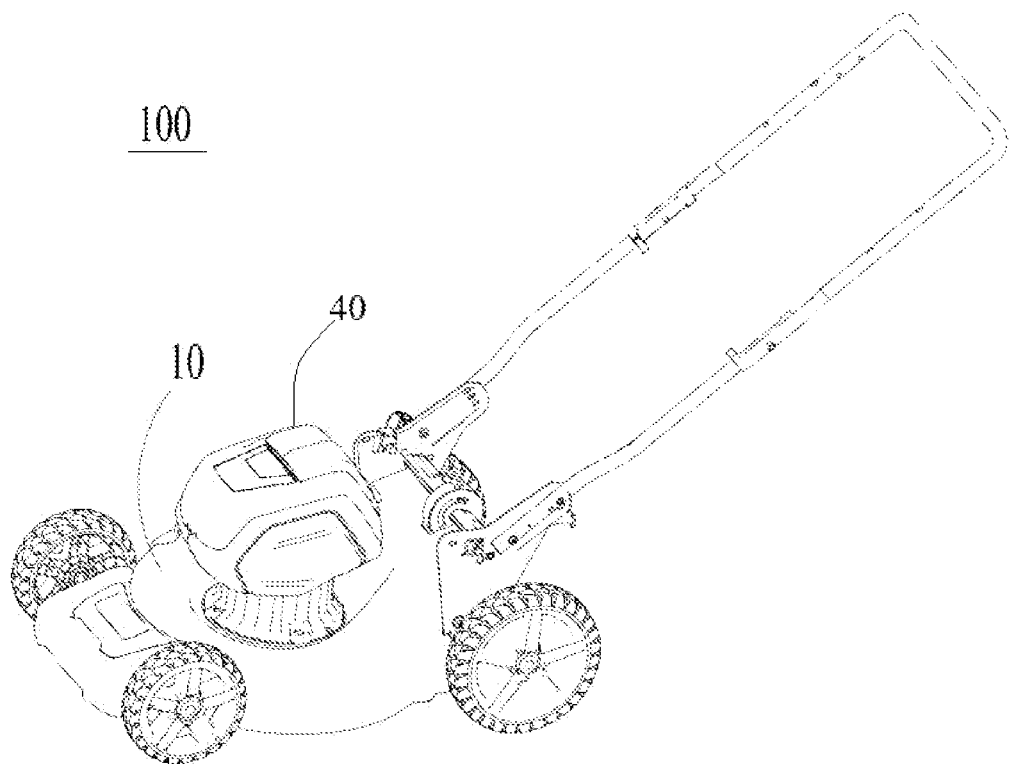
FIG. 1 is a perspective view of the lawn mower according to the present invention.
Figure 2:
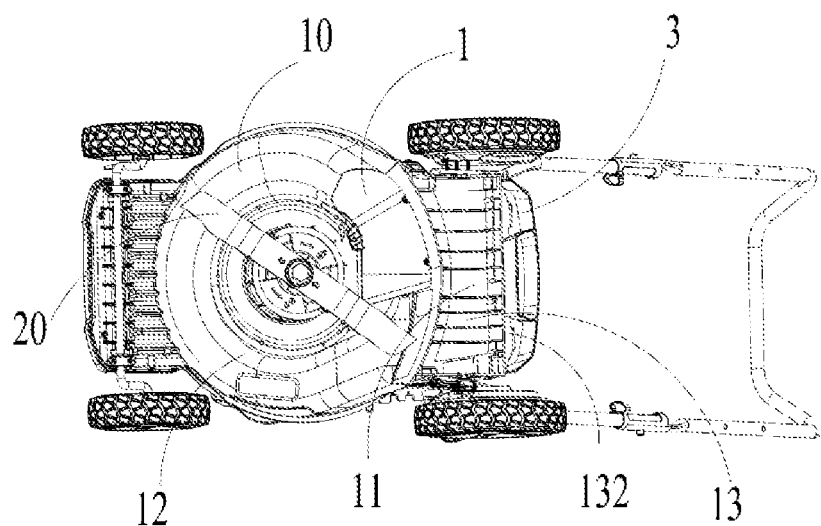
FIG. 2 is another perspective view of the lawn mower of the present invention.

As shown in FIG. 1 and FIG. 2, the lawn mower 100 includes a cover 10, an energy assembly (not shown) installed in the cover 10, a power assembly 40 powered by the energy assembly, and a cutting blade 20 driven by the power assembly. The lawn mower can switch between four shredded grass processing modes, with convenient operation and simple structure.

Figure 4:
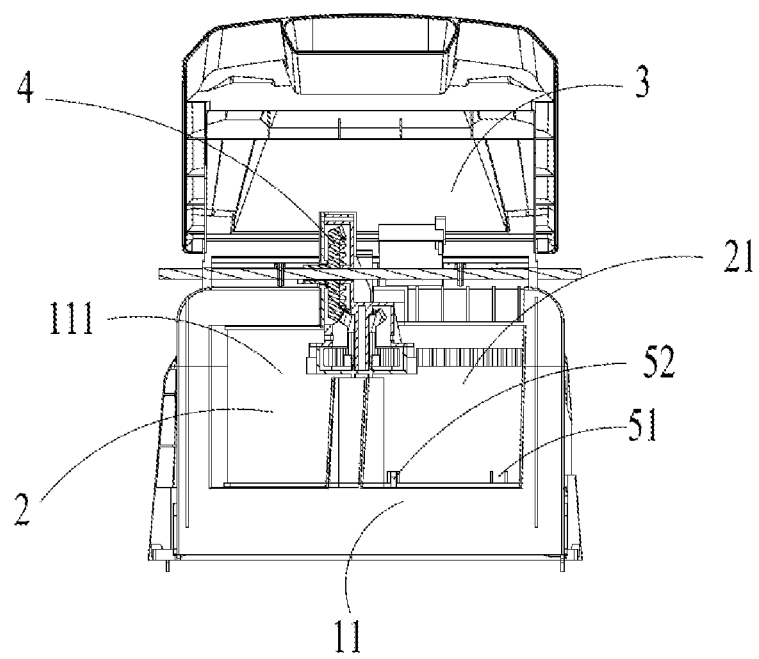
FIG. 4 is a schematic diagram when the baffle of the present invention is moved to a separated position.

As shown in FIG. 2 and FIG. 4, the cover 10 includes a main body 1, a partition portion 2, a rear cover 3, a transmission assembly 4, and a limiting assembly 5. The main body 1 includes a fixing portion 11 at the rear of the main body 1. The fixing portion 11 includes a partition plate 111. The partition plate 111 is arc-shaped. In this embodiment, the partition plate 111 and the fixing portion 11 are integrally formed. The partition portion 2 is formed by a baffle 21 slidably disposed on the fixing portion 11. The partition portion 2 divides the main body 1 into a cutting cavity 12 and a grass-collecting cavity 13. The fixing portion 11 constitutes a part of the cutting cavity 12. The baffle 21 is also arc-shaped, which is beneficial to the partition portion 2 and the main body 1 to form an arc-shaped cutting cavity 12.

Figure 3:
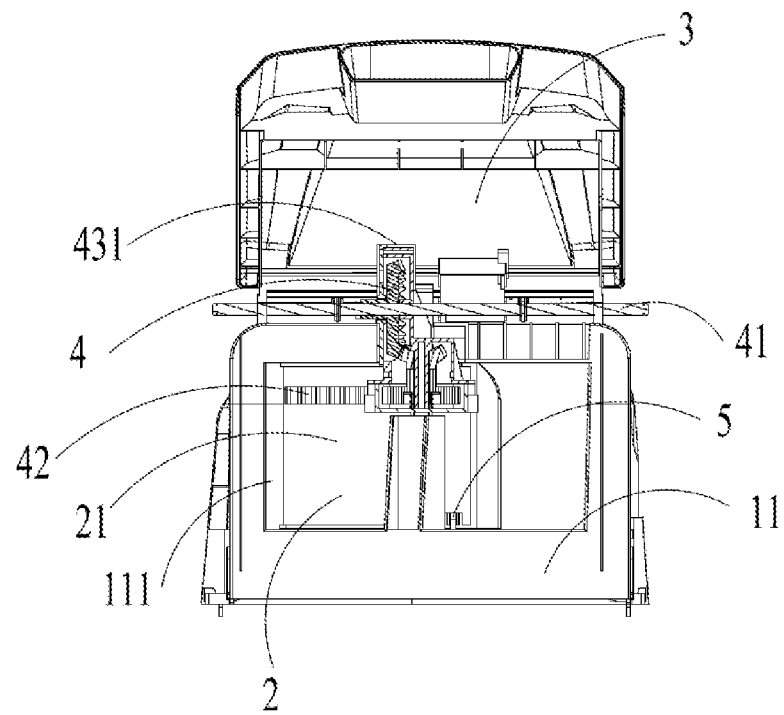
FIG. 3 is a schematic diagram when the baffle of the present invention is moved to a connected position.
Figure 5:
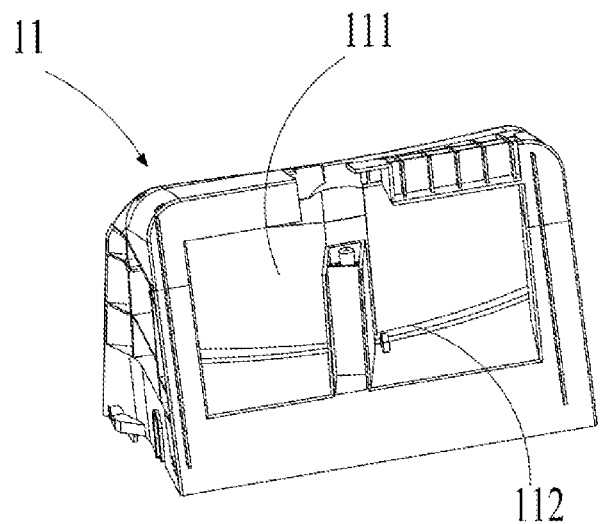
FIG. 5 is a perspective view of the fixing portion of the present invention.
Figure 6:
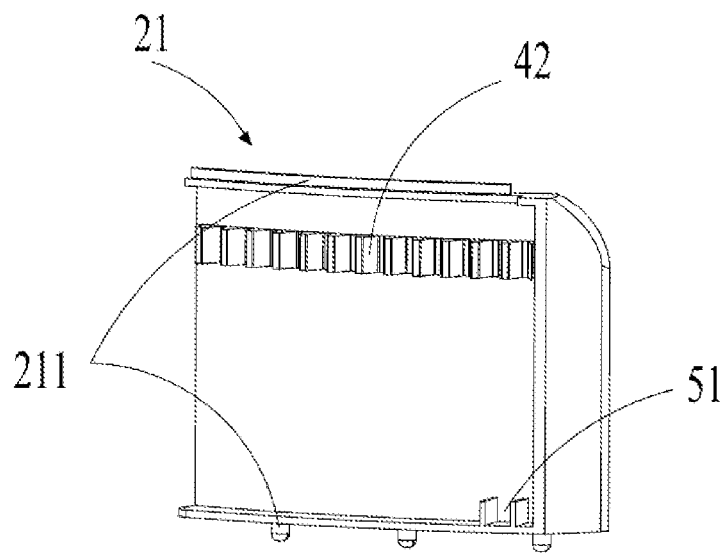
FIG. 6 is a perspective view of the baffle according to the present invention.

As shown in FIG. 3, FIG. 5, and FIG. 6, a slide 112 is provided on the fixing portion 11, and sliders 211 are provided on the upper and lower ends of the baffle 21. The sliders 211 are installed in the slide 112 so that the baffle 21 moves along the slide 112 between a connected position and a separated position. When the baffle 21 moves to the connected position, the partition plate 111 overlaps with the baffle 21, and the cutting cavity 12 communicates with the grass-collecting cavity 13. When the baffle 21 moves to the separated position, the partition plate 111 and the baffle 21 are staggered, the cutting cavity 12 is separated from the grass-collecting cavity 13 by the baffle 21.

Figure 7:
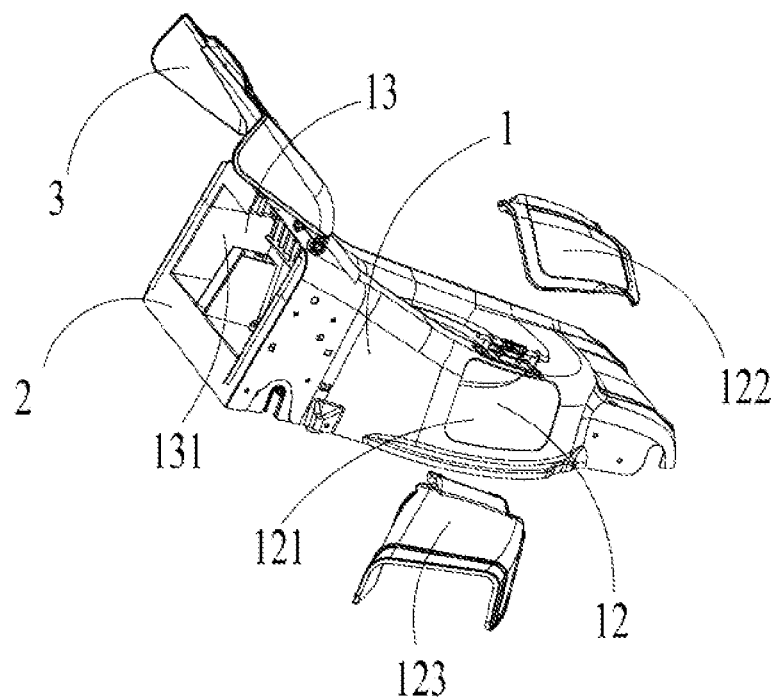
FIG. 7 is an exploded perspective view of the main body of the present invention.

As shown in FIG. 2 and FIG. 7, the cutting cavity 12 is similar to a circle, and is surrounded by the main body 1 and the partition portion 2. A cutting blade 20 protruding beyond the main body 1 is provided below the cutting cavity 12. A side opening 121 is provided on one side of the cutting cavity 12. A reversible side cover 122 and a side detachable pipe 123 are provided at the side opening 121. The side cover 122 is flipped up to expose the side opening 121, and then side discharge pipe 123 is assembled to the side opening 121, so that a passage for discharging broken grass is formed on the side of the lawn mower. The grass-collecting cavity 13 is located behind the cutting cavity 12, and is surrounded by the main body 1, the partition portion 2, and the rear cover 3. A rear opening 131 is formed at the rear of the grass-collecting cavity 13, and the rear cover 3 can realize opening and closing of the rear opening 131.

Figure 9:
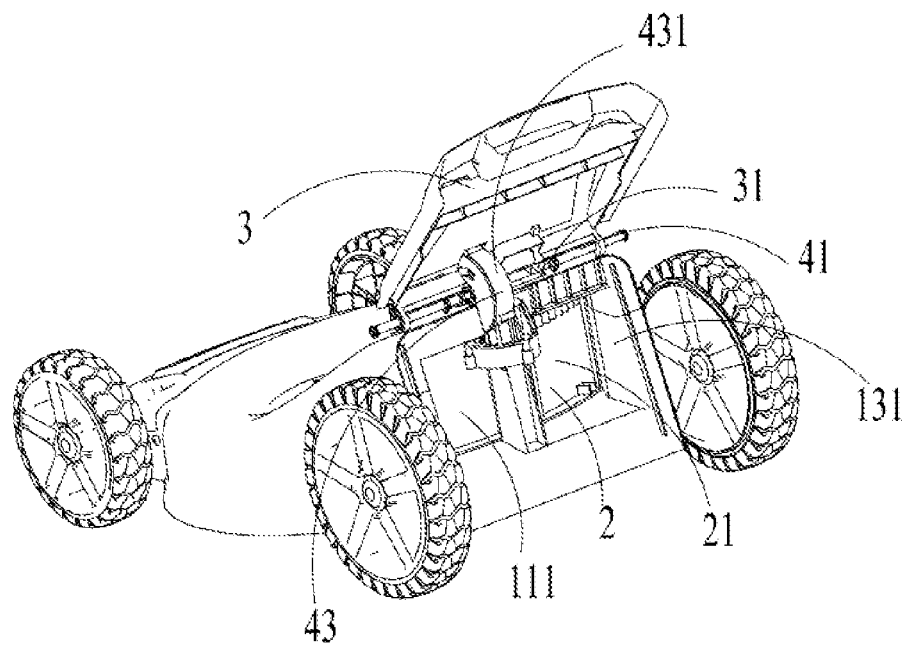
FIG. 9 is a schematic diagram of when the rear cover is flipped to the open position according to the present invention.
Figure 10:
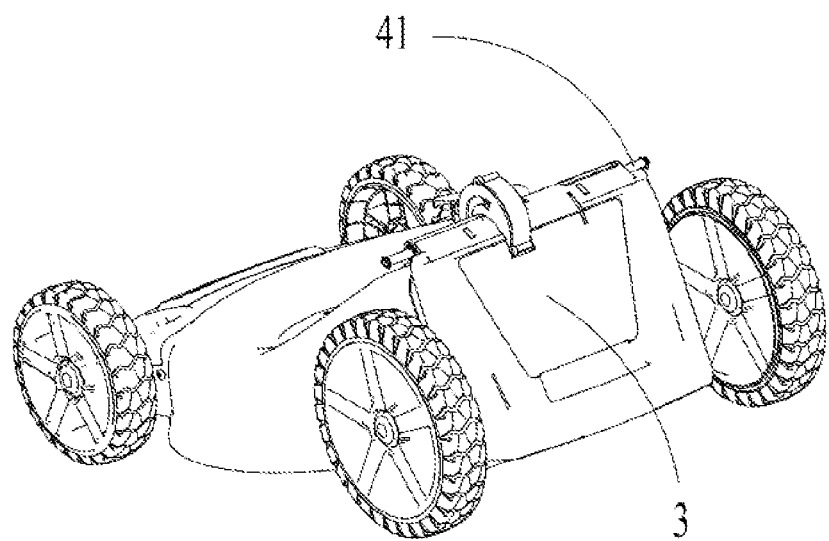
FIG. 10 is a schematic diagram when the rear cover is flipped to the closed position according to the present invention.

As shown in FIG. 2, FIG. 9 and FIG. 10, the rear cover 3 is pivotally connected to the main body 1 through a rotating shaft 41 provided on the main body 1, so that the rear cover 3 is rotated between the open position and the closed position. Specifically, when the rear cover 3 is flipped up to the open position, the rear opening 131 is opened. When the rear cover 3 is flipped down to the closed position, the rear opening 131 is closed. At the same time, when the rear cover 3 abuts on the rear opening 131, a narrow and long outlet 132 is formed at the bottom wall of the rear cover 3 adjacent to the main body 1. The outlet 132 is used for discharging the broken grass in the grass-collecting cavity 13. In addition, a spring 31 is sleeved on the rotating shaft 41. The spring 31 is located between the rear cover 3 and the main body 1. The spring 31 is a torsion spring, which always exerts a downward force on the rear cover 3.

The rear cover 3 is arranged in linkage with the baffle 21 through the transmission assembly 4, so that the rear cover 3 can move the baffle 21 in the left-to-right direction by turning up and down the rear cover 3 to realize the communication and separation between the cutting cavity 12 and the grass-collecting cavity 13. Specifically, when the rear cover 3 is flipped to the open position, the baffle 21 moves to the connected position, and the cutting cavity 12 communicates with the grass-collecting cavity 13. When the rear cover 3 is flipped to the closed position, the baffle 21 moves to the separated position, the cutting cavity 12 is separated from the grass-collecting cavity 13.

Figure 8:
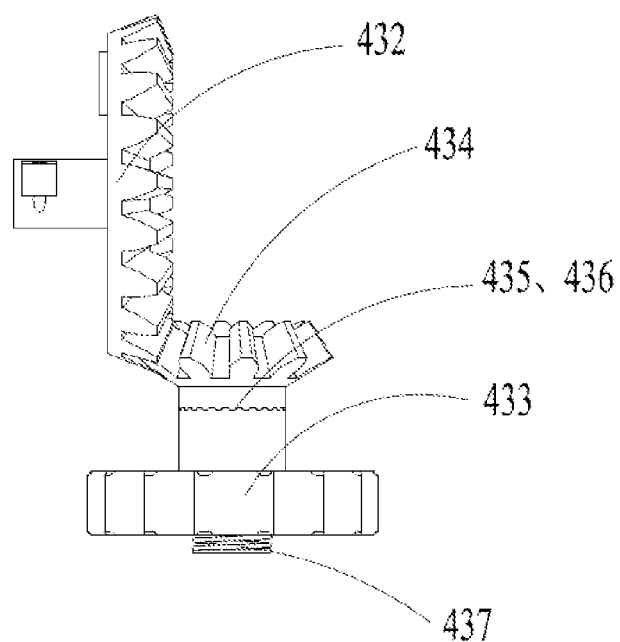
FIG. 8 is a partial schematic diagram of the transmission assembly according to the present invention.

As shown in FIG. 3 and FIG. 8, the transmission assembly 4 includes a rotating shaft 41 provided on the rear cover 3, a gear bar 42 provided on the baffle 21, and a transmission member 43 provided in the grass-collecting cavity 13. The transmission member 43 includes a housing 431, an input gear 432, an output gear 433, and an intermediate gear 434 located between the input gear 432 and the output gear 433. The input gear 432, the output gear 433 and the intermediate gear 434 are disposed in the housing 431. The input gear 432 is sleeved on the rotating shaft 41 and the output gear 433 is coupled with the gear bar 42.

The rotating shaft 41 and the longitudinal axis of the output gear 433 are arranged perpendicular to each other. The input gear 432 and the intermediate gear 434 are a pair of matched bevel gears. The intermediate gear 434 and the output gear 433 have two opposing friction surfaces 435 and 436 between the intermediate gear 434 and the output gear 433. Preferably the friction surfaces 435 and 436 are wave-shaped. A cushion ring (not shown) and a spring 437 are provided below the output gear 433. The cushion ring is located between the output gear 433 and the spring 437 to reduce friction between the spring 437 and the output gear 433. The spring 437 is located between the housing 431 and the cushion ring to make the friction surface 436 of the output gear 433 and the friction surface 435 of the intermediate gear 434 are in contact with each other.

As shown in FIG. 4 and FIG. 6, the limiting assembly 5 includes a groove 51 disposed below the baffle 21 and a hook 52 disposed in the grass-collecting cavity 13 and cooperating with the groove 51. When the hook 52 is locked in the groove 51, the flip of the rear cover 3 cannot move the baffle 21. When the hook 52 is separated from the groove 51 without being locked, the flip of the rear cover 3 can drive the movement of baffle 21.

When the floor covering processing mode is adopted, the side cover 122 is used to block the side opening 121. The rear cover 3 is flipped to the closed position and the baffle 21 is moved to the separated position. Specifically, the cutting blade 20 cuts the grass, and the broken grass enters the cutting cavity 12 and is cyclically cut in the cutting cavity 12 to further crush the broken grass. At the same time, the crushed grass is directly discharged from below the cutting cavity 12. With this processing mode, the operation is convenient and simple, and the broken grass can be used as a fertilizer to nourish the lawn.

When the side-discharge processing mode is adopted, the side cover 122 is flipped up to expose the side opening 121. The side discharge pipe 123 is assembled, and the rear cover 3 is flipped to the closed position and the baffle 21 is moved to the separated position. Specifically, the cutting blade 20 cuts the grass, and the broken grass enters the cutting cavity 12 and exits the cutting cavity 12 through the side opening 121. With this processing mode, the broken grass can be concentratedly discharged at a fixed distance from one side of the lawn mower. When the lawn mower works, the broken grass can be neatly discharged in a straight or curve line. This mode is more suitable for a narrow and long lawn.

When adopting the covering processing mode, the side cover 122 is used to block the side opening 121, and then the baffle 21 is removed, and the rear cover 3 is flipped to the closed position. Or the side cover 122 is used to block the side opening 121 and the rear cover 3 is flipped to the open position, at this time the baffle 21 moves to the connected position, and then the hook 52 is used to lock the baffle 21, and then the rear cover 3 is flipped to the closed position. Since the baffle 21 is locked on the main body 1, when a relative rotation occurs between the intermediate gear 434 and the output gear 433, the baffle 21 is still fixed at the connected position. Specifically, the cutting blade 20 cuts the grass, and the broken grass enters the grass-collecting cavity 13 through the cutting cavity 12 and exits the grass-collecting cavity 13 through the outlet 132. With this processing mode, the broken grass can be evenly discharged from the outlet 132. In the process of pushing the lawn mower, the broken grass is evenly spread on the surface of the lawn, which is more beautiful. After completing this mode of operation, it is only necessary to turn the rear cover 3 to the open position, and then unlock the hook 52.

Figure 11:
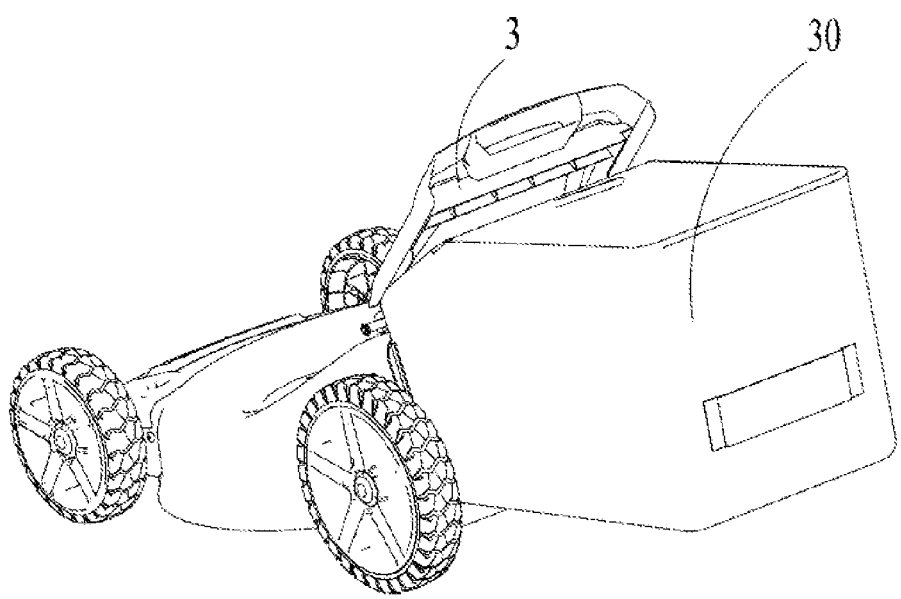
FIG. 11 is a schematic view of the lawn mower of the present invention assembled with the grass collecting bag.

Please refer to FIG. 11, when adopting the grass-collecting processing mode, the side cover 122 blocks the side opening 121 and the grass-collecting bag 30 is assembled to the rear opening 131 of the grass-collecting cavity 13, and the rear cover 3 is flipped to the open position and the baffle 21 is driven to move to the connected position. Specifically, the cutting blade 20 cuts the grass, and the broken grass enters the grass-collecting cavity 13 through the cutting cavity 12 and enters the grass collecting bag 30 through the rear opening 131. With this processing mode, after the cutting is completed, the broken grass can be cleaned in a concentrated way, which is convenient, fast and beautiful.

In summary, the present invention provides a lawn mower, which includes a cover 10, a power assembly, and a cutting blade 20 driven by the power assembly. The lawn mower is provided with a partition portion 2 and the baffle 21 is driven to move left and right by turning the rear cover 3 up and down, so that the cutting cavity 12 and the grass-collecting cavity 13 are connected and separated.

Terms such as "upper", "lower", "left", "right", "front", "rear", and the like indicating spatial relative positions are described for convenience of description as shown in the accompanying drawings the relationship of one feature relative to another. It can be understood that, according to different product placement positions, the terms of spatial relative positions may be intended to include different positions other than the positions shown in the drawings, and should not be construed as limiting the claims. In addition, the descriptive word "horizontal" used herein is not exactly equivalent to allowing a certain angle of inclination along the direction perpendicular to gravity.

In addition, the above embodiment is only used to illustrate the present invention and not to limit the technical solutions described in the present invention. The understanding of the present specification should be based on those skilled in the art, although the detailed specification has been carried out with reference to the above embodiment. However, it should be understood by those skilled in the art that those skilled in the art can still modify or equivalently replace the present invention, and all technical solutions and improvements without departing from the spirit and scope of the present invention should be encompassed within the scope of the claims of the present invention.

What is claimed is:

1. A lawn mower comprising:
   a power assembly;
   a cutting blade driven by the power assembly;
   a limiting assembly; and
   a cover,
   wherein the cover comprises a main body, a rear cover pivotally connected to the rear of the main body, and a partition portion dividing the main body into a cutting cavity and a grass-collecting cavity, the partition portion comprising a baffle,
   the rear cover is selectively pivotal between an open position and a closed position,
   the baffle is driven by the rear cover,
   the limiting assembly comprising a groove provided below the baffle and a hook provided in the grass-collecting cavity and cooperating with the groove,
   when the hook is locked in the groove, the flip of the rear cover cannot move the baffle,
   when the hook is separated from the groove without being locked, the flip of the rear cover can drive the movement of baffle.

2. The lawn mower according to claim 1, wherein the rear cover is rotated between the open position and the closed position, and a rear opening is provided at the rear of the grass-collecting cavity, when the rear cover being flipped up to the open position, the rear opening being opened, when the rear cover being flipped down to the closed position, the rear opening being closed.

3. The lawn mower according to claim 2, wherein when the rear cover is flipped to the open position, the baffle is moved to a connected position, and the cutting cavity is in communication with the grass-collecting cavity, when the rear cover being flipped to the closed position, the baffle moving to a separated position, and the cutting cavity being separated from the grass-collecting cavity.

4. The lawn mower according to claim 1, wherein a side opening is provided on one side of the cutting cavity, and a reversible side cover and a side detachable pipe are provided at the side opening.

5. The lawn mower according to claim 1, wherein the baffle is connected to the rear cover through a transmission assembly, and the transmission assembly includes a rotating shaft provided on the rear cover, a gear bar arranged on the baffle and a transmission member arranged in the grass-collecting cavity.

6. The lawn mower according to claim 5, wherein the transmission member comprises a housing, an input gear, an output gear, and an intermediate gear located between the input gear and the output gear, the input gear, the output gear and the intermediate gear are received in the housing, and the input gear is sleeved on the rotating shaft, the output gear being coupled with the gear bar, and the rotating shaft and the longitudinal axis of the output gear being arranged perpendicular to each other.

7. The lawn mower according to claim 6, wherein the input gear and the intermediate gear are a pair of matched bevel gears, and the intermediate gear and the output gear have two opposed friction surfaces, a cushion ring and a spring being provided below the output gear, the cushion ring being located between the output gear and the spring, and the spring being located between the housing and the cushion ring.

8. The lawn mower according to claim 5, wherein the rear cover is pivotally connected to the main body through the rotating shaft, a spring is sleeved on the rotating shaft, and the spring is located between the rear cover and the main body.

9. The lawn mower according to claim 2, further comprising a grass collecting bag, and when the rear cover is in the open position, the grass collecting bag is assembled to the rear opening of the grass-collecting cavity.

10. The lawn mower according to claim 3, wherein the main body comprises a fixing portion and a partition plate, and the partition plate and the baffle form the partition portion, when the baffle being moved to the connected position, the partition plate overlaps the baffle, when the baffle being moved to the separated position, the partition plate and the baffle being staggered.

11. The lawn mower according to claim 10, wherein the fixing portion is provided with a slide, the upper and lower ends of the baffle are provided with sliders, and the sliders are installed in the slide and move along the slide.

* * * * *